United States Patent [19]

Jones

[11] Patent Number: 5,562,369
[45] Date of Patent: Oct. 8, 1996

[54] CONTAINER LINER

[75] Inventor: Colin E. Jones, Riverstone, Australia

[73] Assignee: Mulawa Trading Co Pty Limited, Riverstone, Australia

[21] Appl. No.: 204,217

[22] PCT Filed: Sep. 4, 1992

[86] PCT No.: PCT/AU92/00472

§ 371 Date: Mar. 7, 1994

§ 102(e) Date: Mar. 7, 1994

[87] PCT Pub. No.: WO93/04954

PCT Pub. Date: Mar. 18, 1993

[30] Foreign Application Priority Data

Sep. 5, 1991 [AU] Australia .................. 83665/91

[51] Int. Cl.$^6$ .................................. B65G 53/20
[52] U.S. Cl. .................................. 406/90
[58] Field of Search .................. 406/86, 89, 90, 406/91, 138; 222/195; 414/676

[56] References Cited

U.S. PATENT DOCUMENTS

| 2,545,766 | 3/1951 | Cline | 406/90 |
|---|---|---|---|
| 2,915,337 | 12/1959 | Loomis | 406/90 |
| 2,919,955 | 1/1960 | Paton | 406/90 |
| 2,943,891 | 7/1960 | Paton | 406/90 |
| 2,968,425 | 1/1961 | Paton | 406/90 |
| 2,975,915 | 3/1961 | Lindley | 406/90 |
| 3,024,072 | 3/1962 | Hermanns | 406/90 |
| 3,061,379 | 10/1962 | Lusted | 406/90 |
| 3,231,312 | 1/1966 | Paton | 406/91 |
| 3,232,673 | 2/1966 | Selig et al. | 406/90 X |
| 3,241,725 | 3/1966 | Carmichael | 406/90 |
| 3,375,042 | 3/1968 | Ostberg et al. | 406/90 |
| 4,172,618 | 10/1979 | Lambert | 406/90 |

FOREIGN PATENT DOCUMENTS

| 601630 | 9/1990 | Australia . |
|---|---|---|
| 010182 | 4/1980 | European Pat. Off. . |
| WO88/06560 | 9/1988 | WIPO . |

Primary Examiner—Andrew C. Pike
Attorney, Agent, or Firm—Lowe, Price, LeBlanc & Becker

[57] ABSTRACT

A floor mat and a container liner which incorporates the floor mat are used in shipping containers that are used to transport compactible powders. The floor mat comprises an upper planar non-flexible sheet and a lower gas impermeable planar sheet held in spaced apart superimposed relationship by a plurality of rigid ribs which extend between the upper and lower planar sheets to form an array of channels that extend substantially the full area of the floor mat. The channels are opened at one end and closed at the other. A gas manifold has an upper portion and a lower portion, each of which join respectively to the upper and lower planar sheets about the open ends of the channels in a manner so as to enable a flow of gas to be provided thereto. The floor mat is secured to the container when in use. The upper planar sheet and the upper portion of the manifold have a plurality of micro-perforations.

19 Claims, 3 Drawing Sheets

CONTAINER LINER

TECHNICAL FIELD

This invention relates to shipping containers used for the transport of materials in fine particulate form that readily compact, in particular, to a floor mat and a container liner incorporating the floor mat, for such containers to facilitate the discharge of these materials. The invention further relates to a method which uses either of the floor mat or the container liner to facilitate the discharge of such materials.

BACKGROUND ART

There are many dry materials in fine particulate form which may have a strongly compacting nature, or are strongly binding, or are characterised by a steep angle of repose. These characteristics either singly or combined cause considerable difficulty in discharging these materials from a shipping container as they will not flow easily even when the container is tipped to an angle of say 45°.

As used in this specification the term "shipping container" and "container" refer to containers that are primarily used for road, rail, and sea transport and are generally rectangular prismatic in shape.

Examples of fine particulate compactible materials include titanium dioxide, pigments, starch, flour, and many chemicals.

Due to the number of materials falling into this category, the prior art is replete with proposals to facilitate the discharge of these materials from shipping and other forms of storage containers. The following U.S. Patents are relevant:

U.S. Pat. No. 2,943,891 (Paton),
U.S. Pat. No. 3,061,379 (Lusted),
U.S. Pat. No. 2,545,766 (Cline),
U.S. Pat. No. 2,919,955 (Paton),
U.S. Pat. No. 2,968,425 (Paton),
U.S. Pat. No. 3,231,312 (Paton),
U.S. Pat. No. 2,915,337 (Loomis),
U.S. Pat. No. 3,024,072 (Hermanns), and
U.S. Pat. No. 3,375,042 (Ostberg et al.).

In U.S. Pat. No. 2,943,891 (Paton) there is disclosed a fluidizing or unloading floor mat to be placed on the bottom of a storage compartment in order to fluidize materials in small particulate form that are held in the storage compartment and thereby assist the flow of material out of the compartment. The floor mat comprises a bottom layer of gas—impervious material and an upper layer of gas—pervious material with the layers secured together at their periphery to form between them a distributing chamber. Means are provided to introduce gas into the chamber whereby the gas under pressure flows through the gas—pervious layer to fluidize the material stored above the mat. Fluidization of the material assists its discharge.

In order to prevent the upper layer from billowing away from the lower layer, one or more substantially vertical webs may be used to connect the layers together to thereby form a number of compartments within the chamber. In place of webs, the layers may be sewn or glued together along spaced lines.

If all of the webs are provided with holes, a single source of gas may be used. It is, however, taught that when webs without holes are used, they form a series of independent chambers that may be separately supplied with gas. This is said to be desirable as it allows gas to be directed to selected portions thereby allowing for the selective fluidization of material over that portion. It is further disclosed that whilst gas may be directly supplied to the distributing chamber, a preferred means is to provide each of the compartments with a pipe that extends the length of the compartment. The pipe has a series of holes along its length so that gas entering a compartment is evenly distributed. The pipe also serves to keep at least a part of the upper layer apart from the lower layer at all times thereby providing an opening that allows some gas to enter the compartment when gas is first directed thereto.

Similar proposals to U.S. Pat. No. 2,943,891 are made by the same inventor in U.S. Pat. No. 2,919,955, U.S. Pat. No. 2,968,425 and U.S. Pat. No. 3,231,312.

In U.S. Pat. No. 3,061,379 (Lusted) there is disclosed an aerator pad for use in facilitating the discharge of pulverulent materials such as cement from bulk storage. The aerator pad is similar in constructions to the floor mat disclosed in the abovementioned U.S. patent although it is said to be normally limp and flexible thereby allowing the pad to be easily placed into a storage tank. Once in place, air under pressure is supplied to the pad to cause its inflation and then to pass through the gas pervious layer to fluidize the material held in the tank.

In U.S. Pat. No. 2,545,766 (Cline) again fluidization is used to facilitate discharge but in this case, air is only supplied to the leading edge of the material.

In U.S. Pat. No. 2,915,337 (Loomis) it is taught that the bed of material is to be fluidized by an upward flow of gas which is then directed downwardly such that material is entrained in a gas suspension. The gas permeable deck used in this invention is said to be formed from medium woven fabric, porous metal or porous stone.

In U.S. Pat. No. 3,024,072 (Hermanns) there is disclosed an arrangement whereby aerating hoses extend longitudinally over the bottom of a container. At the end remote from the discharge end, a transversely extending gas distribution means for the hoses is provided which is disposed at an angle greater than the angle of repose of the material held in the container. This arrangement is said to improve the discharge of material that otherwise may be retained at the end remote from the discharge end owing to insufficient gas flow in this area.

In U.S. Pat. No. 3,375,042 (Ostberg et al.), the disclosed cargo supporting floor is similar in principle to that disclosed in U.S. Pat. No. 2,943,891 (Paton) with the exception that the air distribution means used to fluidize the cargo comprises inflatable envelopes arranged transversely about a centrally longitudinally extending trough that includes a discharge opening. The envelopes slope towards the trough so that when inflated, material is not only fluidized, but directed downwardly toward the trough.

Although the prior art mentioned above provides means for facilitating the discharge of fine particulate compactible powders from storage containers, there are a number of practical disadvantages which the inventor believes have severely limited their commercial use.

These are:

(a) The fact that the flexible layers lie flat, the one upon the other, during loading, storage, and transport. Given the weight of cargo that lies on the mat, there is considerable resistance to the injection of gas between the layers and to its passage under the cargo.

(b) The existence of ridges between the pockets formed by the inflated mat, in which material is trapped and from which manual discharge is both difficult and costly.

(c) "Dead pockets" which exist at the junction of the flexible fluidizing mat and the container walls in which additional material is trapped (for which discharge is both difficult and costly). This disadvantage can be overcome at some significant cost by extending the fluidizing mat up the sides of the container or by adding extra fluidizing panels to the side of a container liner. However, apart from the disadvantage of the added costs involved, the additional panel will cause creases in the flexible-membrane mat which will inhibit the discharge of the final portion of the cargo.

(d) A major reduction in the effective width of the floor mat when inflated through injection of gas; up to one-third of the width is lost as the flexible membranes used form rounded gas tubes and pull away from the container's side walls. Although it is suggested that a restraining rope can be incorporated in the edge of the flexible fluidizing mat and that this rope can be fastened to the floor and/or side walls of the container to largely overcome this problem, it is not practical. The added costs of the modification and of fastening and detaching the rope are high, and in any case shipping containers conventionally used for road, rail and sea transport do not normally contain suitable fixing points and shipping companies are normally opposed to modifying their general purpose containers in any way.

(e) Pervasive dusting caused by fluidization of fine materials which, for environmental reasons, will normally make desirable the use of a full container liner (with top as well as bottom and sides) to fully enclose the cargo and of filtration equipment to minimize the effects and losses of dust.

OBJECT OF THE INVENTION

It is an object of the present invention to meet the problems associated with discharging fine particulate compactible materials by providing a low cost floor mat, which may be easily installed into a shipping container, whereby such materials may be discharged completely and easily with minimal dusting, whilst being able to meet the varying needs of receivers of such materials.

SUMMARY OF THE INVENTION

Accordingly, in a first aspect the present invention consists of a floor mat for a shipping container which is useful for the transport of fine particulate compactible material. The floor mat includes an upper planar non-flexible sheet and a lower gas impermeable planar sheet held in spaced apart superimposed relationship by a plurality of rigid ribs which extend between the upper and lower planar sheets to form an array of channels that extend substantially the full area of the floor mat. The channels are opened at one end and closed at an opposing end. A gas manifold has an upper portion and a lower portion each of which join respectively to the upper and lower planar sheets about the open ends of the channels in a manner so as to enable a flow of gas to be provided thereto. A means is provided to secure the floor mat to the container when in use. The upper planar sheet and the upper portion of the manifold have a plurality of microperforations.

In a second aspect, the present invention further consists of a container liner including a floor mat, the periphery of which is surrounded by a collapsible web so as to form with the floor mat an enclosed space to contain a fine particular compactible material. The floor mat includes an upper planar non-flexible sheet and a lower gas impermeable planar sheet held in spaced apart superimposed relationship by a plurality of rigid ribs which extend between the upper and lower planar sheets to form an array of channels that extend substantially the full area of the floor mat. The channels are opened at one end and closed at the other. A gas manifold has an upper portion and a lower portion each of which join respectively to the upper and lower planar sheets about the open ends of the channels in a manner so as to enable the flow of gas to be provided thereto. A means is provided to secure the floor mat to the container when in use. The upper planar sheet and said upper portion of the manifold have a plurality of microperforations. The collapsible web has a means to connect to the inside of a container so as to permit the web to be formed into upstanding walls when installed in a container.

In a third aspect, the present invention still further consists of a method of discharging fine compactible material from a container comprising fitting a container with the aforementioned floor mat or the aforementioned container liner, and filling the container with fine compactible material. A flow of gas is introduced into the floor mat at a pressure and a flow rate so as to sufficiently reduce forces between the powder particles and floor mat such that when the powder is tipped it will move towards a discharge outlet.

In order to better understand the nature of the invention, two embodiments of a container liner of the invention will be described with reference to the following drawings.

DISCLOSURE OF INVENTION

Figure 1:
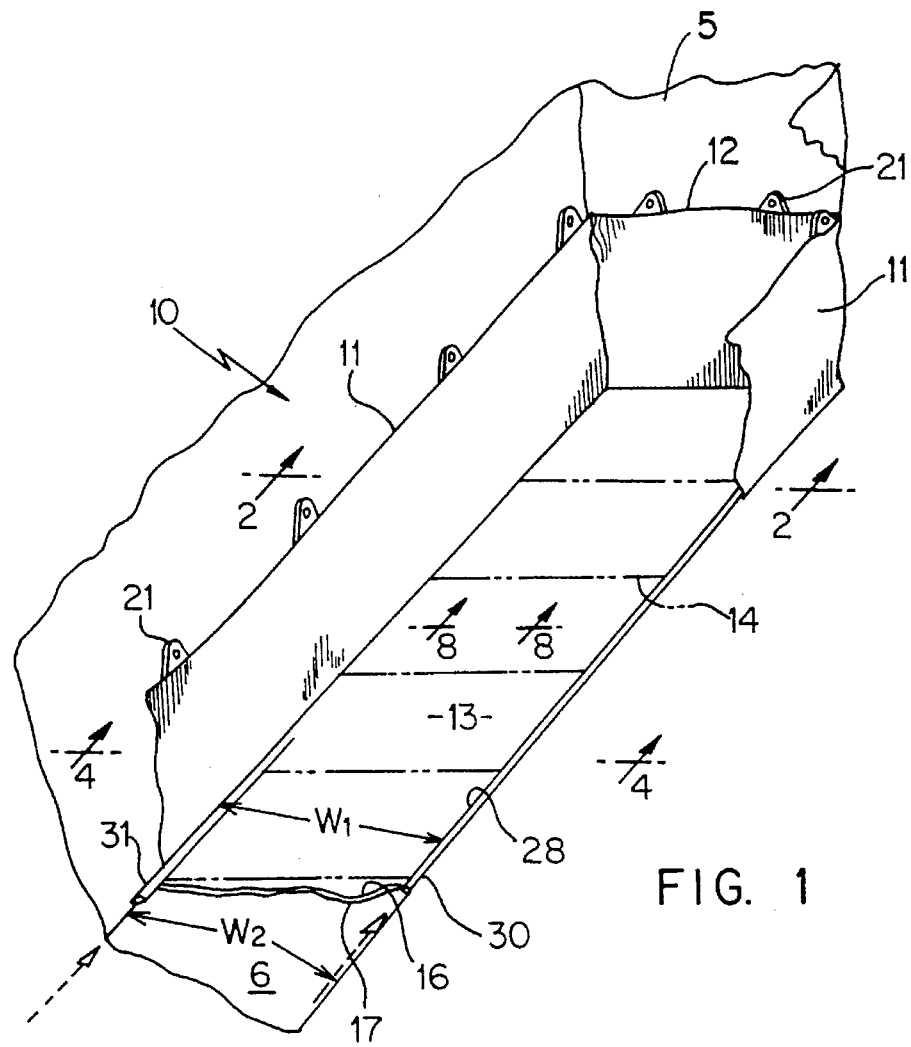
FIG. 1 is a partial cutaway perspective view of a first embodiment of the container liner of the invention.

By providing a floor mat that has an upper sheet that is gas permeable by virtue of its micro-perforations but is non-flexible and planar the possibility of material becoming deposited in the spaces between the flexible compartments of the prior art floor mats is avoided.

Furthermore, the use of rigid ribs between the upper and lower sheets negates the need to provide adequate gas pressure to inflate the flexible compartments taught by the prior art. In fact relatively low gas pressures are preferably used which may be more readily and cheaply provided and reduce dusting.

A further advantage is that, owing to the nature of the upper planar sheet, the floor mat can be walked on without damage which is certainly advantageous during installation. This is not necessarily possible in the case of the prior art inflated mats which of course could be readily punctured if walked upon.

A still further and the most significant advantage is that the loss of width of an inflated floor mat, described hereinabove, does not occur in the floor mat of this invention as its dimensions remain substantially consistent irrespective of loading.

The upper and lower planar sheets are preferably formed from a synthetic plastics material, examples of which include polypropylene, polypropylene copolymer, high density polyethylene, and low density polyethylene.

Particularly useful forms of planar sheets are those which are integrally formed with the ribs interposed therebetween. These forms are commercially available in a variety of extrusions and synthetic plastics material to yield a range of compressive strengths and other properties. Generically, they are referred to as double-skinned fluted sheets, examples including Corflute and Polyflute which are trademarks of Nylex Corporation Ltd., Fluteboard and Multiflute, which are trademarks of Corex Plastics Australia Pry. Ltd, and Printflute which is a trademark of Mulford Plastics Pry. Ltd.

Corflute is one material that is particularly suitable and is available in a range of grades according to weight per square meter. Thus, 504 gsm Corflute has a thickness of 2.95 mm and a compressive strength of 153kPa which is achieved with average sheet thicknesses of 0.17 mm and 0.20 mm and 0.34 mm thick ribs, arranged at 69 ribs per 400 mm. By comparison 736 gsm Corflute has a thickness of 3.90 mm and a compressive strength of 408 kPa which is achieved with average sheet thicknesses of 0.23 mm and 0.24 mm and 0.42 mm thick ribs arrayed at 69 ribs per 400 mm.

It is also possible to obtain these double-skinned fluted sheets with ribs arrayed at 123 per 400 mm. Multiflute is available in this form.

It will therefore be evident that given a particular material load requirement, such a suitable sheet material may be readily selected. Generally, however, the sheet material will have a compressive strength of not less than about 150 kPa or a load yield of not less than about 7 kg per $cm^2$.

Given the inherent strength and inertness of these sheet materials a floor mat or container liner of the invention made using these sheets may be used, cleaned as necessary, and reused many times over.

Alternatively, for single use applications, the upper and lower planar sheets and ribs may be formed from a suitable strength cardboard material.

Preferably the ribs will be arrayed so as to extend transversely across the floor mat. In this way, the open ends of the channels will lie along one longitudinal peripheral edge of the mat whilst the other closed ends of the channel will lie along the opposing longitudinal peripheral edge. Using this arrangement, the mat may be mechanically creased in a number of suitably spaced-apart transverse lines thus permitting the mat to be readily folded along these creases into a convenient shape for transport and storage pending reuse.

The upper planar sheet is micro-perforated, typically with holes of about 0.1–0.2 mm diameter. These micro-perforations are preferably evenly distributed over the full area of the upper planar sheet so as to ensure even gas distribution over the full area of the mat. A rate of about 35,000 micro-perforations per square meter has been found to provide adequate gas permeability.

The microperforations may be introduced into the upper planar sheet by puncturing using an appropriate diameter needle or other sharp instrument. This may be done using a sewing machine.

A gas manifold is provided to distribute gas under pressure to each of the channels. Preferably the manifold is formed from a flexible web, one end of which constituting an upper portion of a manifold is affixed to the upper planar sheet, whilst the opposing end of the web constituting a lower portion of a manifold is affixed to the lower planar sheet about the open ends of the channels. In this way, either of the two opposing openings formed by the other two ends of the web may be closed, with the other provided with a source of gas under pressure. By extending the web the full length of the planar sheets, all of the channels will be supplied with gas.

Conveniently, the end adjacent to the discharge end of the container will receive the gas.

The flexible web may be attached to the planar sheets by a variety of means of which the most preferred is by stitching.

In order to ensure that no space is available between the walls of the shipping container and the floor mat to thereby trap material being stored in the container, preferably the floor mat is dimensioned to substantially occupy the full area of the container. In this regard, the use of a flexible web to form the gas manifold is desirable as it allows for some variation in the internal dimensions of the shipping container which can vary somewhat depending on the container manufacturer. For guidance, the width of the planar sheets can be about 20–120 mm less than the inside width of the shipping container.

Whilst the source of gas must be capable of delivering gas at greater than atmospheric pressure to the floor mat, in order to avoid fluidization of the bed of material in the container and the attendant dusting problems, a pressure in the range of about 13–35 kPa (gauge pressure) will usually suffice. At such low pressures it is best to provide the gas using a blower at a flow rate of about 0.4–0.8 $m^3$ of gas per minute per square meter.

It is, however, possible to use compressed gas. In this case, it is preferred to provide a rigid pipe which is disposed longitudinally within the gas manifold with one end of the pipe closed and the other connected to the source of compressed gas. Along the length of the pipe are provided a series of 6–12 mm holes. This pipe functions to reduce gas velocity and distribute the gas within the manifold. Generally, the pipe will not need to be as long as the manifold with a length of about 1 meter within the manifold being adequate.

To ensure that the floor mat is not discharged with the load of material when the container is tipped, it is desirable to provide means for retaining the floor mat within the container. One means comprises a pair of reinforced tapes adhered to the underside of the floor mat, each of which extends to one of the corners of the floor mat remote from the discharge end. At each of these two corners is an eyelet attached to the floor mat and one of the tapes. Ropes are attached to the eyelets and tied back to internal lugs on the inside rear of a container's walls. Alternatively, a pocket may be formed at the edge of the floor mat remote the discharge end, a batten placed in the pocket, and the batten affixed to the container floor by, for example, screws or nails.

Whilst the floor mat of the invention may be used to facilitate discharge of fine particulate compactible materials from shipping containers, the second aspect of the invention provides further utility in using the floor mat together with walls arrayed around the periphery of the floor mat to form a container liner.

Use of such a liner in a container eliminates the possibility of the contained material becoming retained between the lower inner surface of the container wall and the edges of the floor mat. In addition, contact between the inner surface of the container and the contained material can be eliminated.

The collapsible web of the container liner which forms the walls is connected to the inside of the container in order to maintain them in an upstanding state. One means for achieving this connection is to provide eyeletted tags at the tops of the walls and attach these to lines which run along the upper portion of the inner surfaces of the shipping container.

In order to allow materials to be discharged, one or more outlets will be provided in the wall at the discharge end of the container liner.

Although the outlet(s) may vary widely in dimension to suit individual material and other requirements, it is desirable when the outlet is relatively small to provide directors within the container liner to direct the material flow to the outlet.

In one form, flow directors may be formed into the floor mat by mechanically creasing triangular portions of the mat at the outlet end. The triangular portions are folded upwardly with blocks being inserted between the floor of the container and the underside of the triangular portions for support, thereby producing a chute-like shape. These blocks may be made from polyurethane, and the like. Alternatively, plywood sheets may be used in a wedge-like fashion to provide the requisite support. A still further way of forming flow directors is to cut out rather than crease a triangular portion. The triangular portions are then rejoined to the floor mat using flexible reinforced tape. In this way, the triangular portions can be folded upwardly about the tape and supported in the same manner described above.

If a bulkhead is used at the discharge end of the shipping container, it may include discharge outlets and possibly loading inlets. A container liner of the invention may be provided with corresponding inlets and outlets to match those present in the bulkhead.

Although not essential to the invention in cases of for example excessive dusting, the container liner may have a top so as to completely enclose materials stored therein. This top may be provided with inlet(s) to allow loading of the container.

The collapsible web and the top of the liner will generally be formed from a suitable grade of synthetic plastic sheeting.

Connection of the collapsible web to the floor mat may be achieved for example by stitching whilst the liner top may be similarly connected to the collapsible web.

In some circumstances, such as when controlled discharge of material from a container is required, it is advantageous to provide means by which gas may be selectively directed to channels as required. For example, gas can be provided to the channels underlying the leading edge of the material which initially will be at the discharge end.

One means for achieving this end is by providing a second gas manifold in communication with a number of the channels, whereby this gas manifold functions to both close the channel and provide a flow of gas thereto when the manifold is connected to a source of gas under pressure. The second gas manifold will be located along the side of the floor mat opposite that of the first gas manifold.

Although the second gas manifold can be formed in like manner to the first gas manifold, preferably a portion of the mat and/or liner wall will be removed at the point where they connect and a second gas manifold formed as the first gas manifold.

In circumstances where compressed gas is used, a longitudinally extending pipe may also be inserted into the second gas manifold in like manner to that described in respect to the first gas manifold.

In some circumstances, for example when there are restrictions as to the maximum angle a container may be tipped, it may be advantageous to include a false bottom between the floor mat and the floor of the container such that the floor mat slopes downwardly towards the discharge end. The false bottom may be formed using blocks of polyurethane, or an inflatable air bag, or other means to ensure adequate support.

BEST MODES FOR CARRYING OUT THE INVENTION

Referring to FIGS. 1–7 of the drawings, the container liner 10 shown in FIG. 1 comprises a floor mat 13 which is stitched at its peripheral edges to a collapsible web to form walls 11, 12. These walls are held in an upstanding state when fitted in a container 5 by passing a tie line through eyelets 21 on the upper edge of the walls and connecting the tie line to tags mounted within the container towards its top. Preferably, floor mat 13 is dimensioned to substantially occupy at least the full area of floor 6 of the container 5. As seen in FIG. 1, preferably the width $W_1$ of upper and lower planar sheets 16, 17 is approximately 20 to 120 mm less than the inside width $W_2$ of the container 5.

As shown, the walls 11 extend to form the longitudinal sides of the container liner 10, whilst walls 12 disposed between walls 11 form the ends. For the sake of clarity, wall 12 forming the discharge end has been cutaway from FIG. 1.

Figure 2:
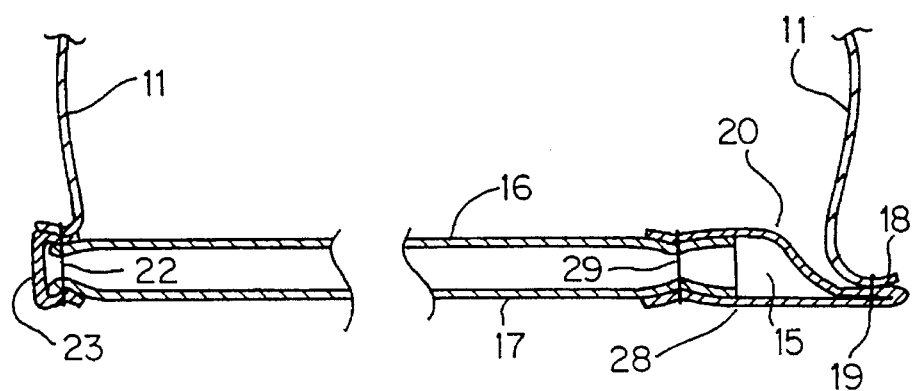
FIG. 2 is a sectional view taken along Lines 2—2 of FIG. 1.
Figure 3:
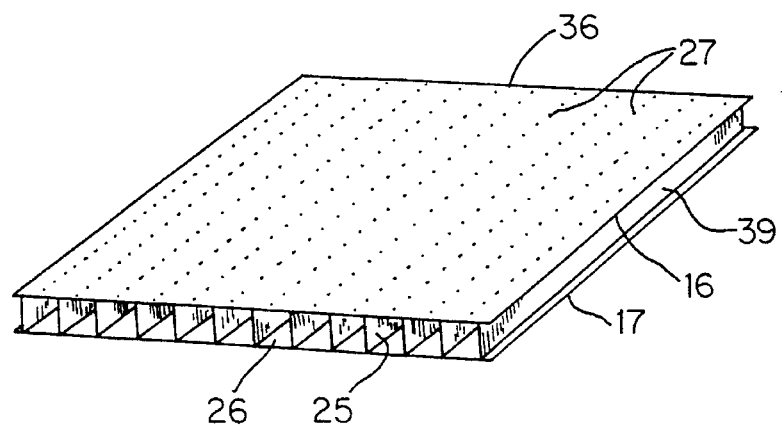
FIG. 3 is a side elevational view of a section of the floor mat of FIG. 1.
Figure 8:
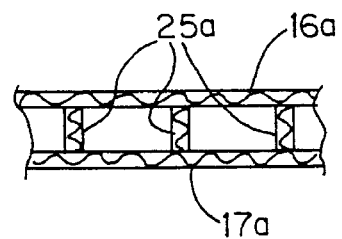
FIG. 8 is a cross-sectional view taken along line 8—8 of FIG. 1.

As is best seen in FIG. 2, the floor mat is formed from upper and lower non-flexible planar sheets respectively 16 and 17. In FIG. 3 these sheets 16, 17 can be seen to be spaced apart by ribs 25 which extend transversely in the floor mat to form channels 26. Upper and lower planar sheets 16, 17 and ribs 25 may be made of synthetic plastic, as depicted in FIGS. 1–3. Alternatively, referring to FIG. 8, the upper planar sheet 16a, the lower planar sheet 17a, and the ribs 25a may be made of cardboard. The channels 26 all are open along longitudinally extending peripheral edge 36.

Along its full length, the edge 36 has a gas manifold 28 connected thereto. The gas manifold 28 comprises a flexible web, which is folded in a manner such that one end is connected to sheet 16 whilst the other end is connected to sheet 17 to form a space 15 through which gas may flow. Both connections are made by a single line of stitching 29. As shown in the figures, the gas manifold is in an uninflated form.

Edge 39 adjacent edge 36 forms the leading edge at the discharge end. At the edge of the floor mat opposing edge 36, the channels 26 are closed by stitching 22, with a web 23 surrounding their openings. As shown in FIG. 2, wall 11 is connected to the floor mat and web 23 by the same stitching.

The other wall 11 is, however, connected to the floor mat via the gas manifold 28. In this case, outer portion 18 of the gas manifold is stitched by a line of stitching 19 to the wall 11. In upper planar sheet 16 and upper portion 20 of the gas manifold are micro-perforations 27 about 0.1–0.2 mm in size.

Figure 4:
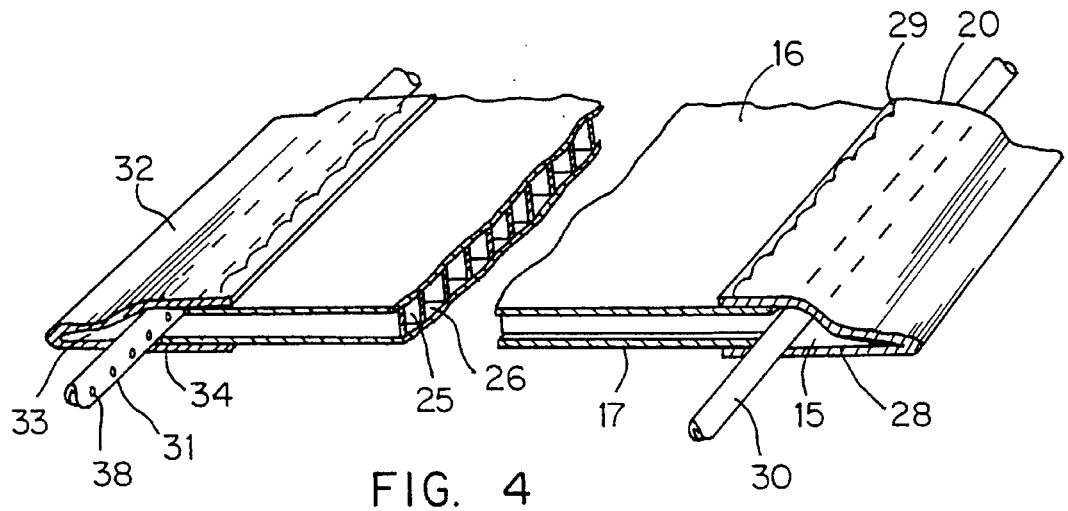
FIG. 4 is a sectional view taken along lines 4—4 of FIG. 1.

As is best been in FIG. 4, there is a second gas manifold 33 which is formed in like manner to manifold 28. A flexible web is folded in a manner such that one end is connected to sheet 16 whilst the other end is connected to sheet 17 to form a space 34 through which gas may flow. Both connections are made by stitching. As is evident from FIG. 1 whilst gas manifold 28 extends the full length of the container liner, gas manifold 33 stands only a part way from the discharge to the closed end. The upper portion 32 of manifold 33 is micro-perforated.

Figure 5:
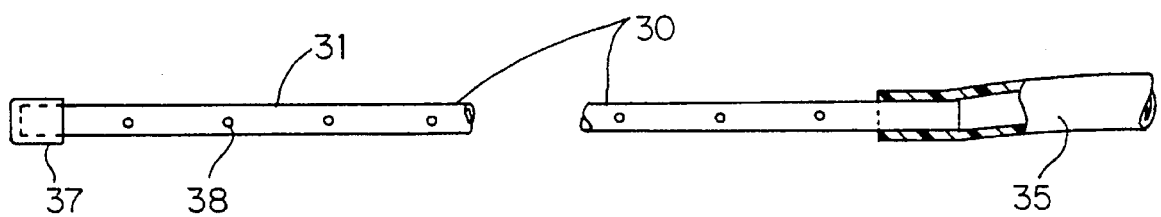
FIG. 5 is a partial sectional view of the pipe of the first and second gas manifolds of FIG. 4.

In this embodiment, a source of compressed gas is used and hence longitudinally extending pipes 30, 31 are inserted into spaces 15, 34 of the two manifolds. As is shown in FIG. 5, pipes 30, 31 includes a number of openings 38 along their lengths, both being closed by a cap 37 and provided with compressed gas through hose 35.

Figure 6:
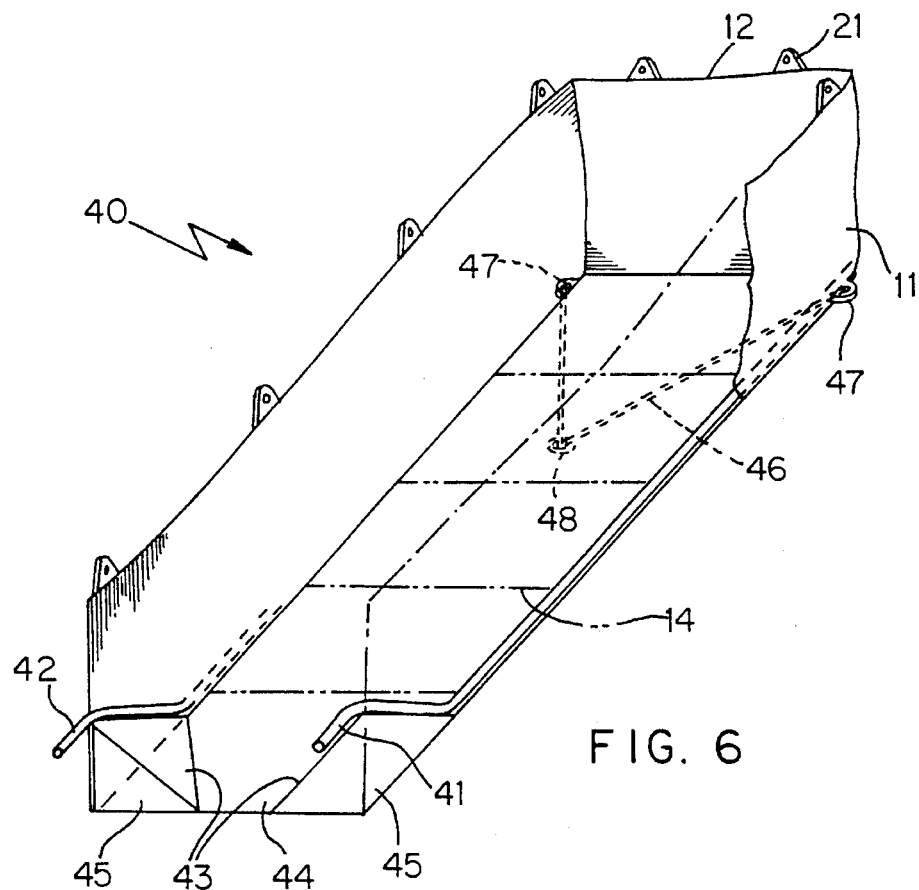
FIG. 6 is a partial cutaway perspective view of a second embodiment of the container liner of the invention.

In FIG. 6 there is shown a second embodiment of a container liner of the invention, generally designated as reference numeral 40. In this figure, those features the same as the first embodiment are referred to by the same numerals.

This embodiment principally differs from the first embodiment by being provided with flow directors 43. These are formed at the discharge end by mechanically creasing triangular portions of the floor mat and folding them upwardly to form a chute or outlet 44. Blocks of polyurethane 45 or plywood supports are placed on the floor of the container and the underside of the folded portions for support.

Through the use of the flow directors 43, pipes 41, 42 which provide gas respectively to the first and second gas manifolds will normally curve to follow the slope of the edge of the flow directors.

Towards the closed end of the container liner 40, on the underside of the floor mat are reinforced tapes 46 both of which extend from a point 48 to meet with eyelets 47 attached to the end of the floor mat remote from the discharge end. Ropes, not shown, are attached to eyelets 47 and to the internal lugs of the container to secure the container liner therein.

Figure 7:
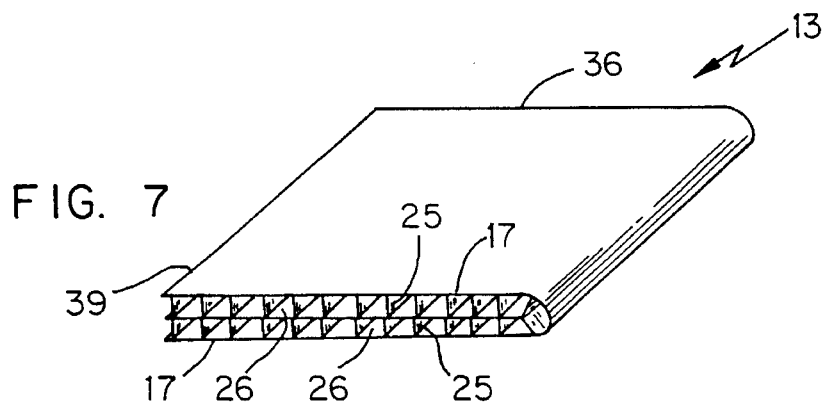
FIG. 7 is a side elevational view of the floor mat of FIG. 3 when folded.

In order to be able to conveniently store a liner when not in use, it may be readily folded as is shown in FIG. 7. For the sake of clarity, the walls 11, 12 are not shown. In this case, the floor mat 12 has been folded about crease lines shown as 14 in FIG. 1.

In use, the container line 10 is placed in a shipping container, the walls 11, 12 tied up using tags 21, and the liner secured by affixing tie lines between eyelet 48 and tags 47 in the container. Material is then loaded through the liner's open top or through inlets in the liner's discharge wall (not shown).

To discharge material, the container doors are opened, assuming that a bulkhead is used, and hoses 35 unfolded. The container discharge outlets are opened and the liner discharge outlets, unfolded and/or untied, pulled through the container outlets, and aligned with a receiving receptacle. The hose 35 is connected to source of compressed gas, the container is tipped to an initial angle of about 10°, and the gas supply started if desired, gas may be introduced into the second manifold 33 via a hose connection to pipe 31, prior to commencement of feeding gas into manifold 28.

A cushion of gas immediately forms beneath the material which commences to slide towards and out of the container.

Some bubbles of gas are visible as some of the gas finds its way up through the cargo, and when the cargo level reduces to about 200 mm some fluidization takes place even at low gas pressure. However, it is possible to adjust gas pressure to minimize fluidization and dusting. The container may be elevated to 30°–45° for final discharge, which is for all practical purposes complete, without significant residues remaining in the container. The mat/liner is then folded along pre-creased fold lines thereby enabling it to be transported and/or stored pending re-use.

Discharge of a container may be completed in 2–3 minutes if rapid discharge is acceptable, and is otherwise dependent on the size of discharge outlets, the capacity and shape of the receiving receptacle, the angle of tilt, and whether a container liner or a floor mat is used.

Whilst this invention has been described with reference to certain embodiments these are to be construed as illustrative and not limiting to the scope of the invention as broadly described.

INDUSTRIAL APPLICABILITY

This invention provides a floor mat for use in a shipping container and a container liner incorporating the floor mat. These are useful and have industrial application in the transport of bulk particulate compactible materials.

I claim:

1. A floor mat for a shipping container which is useful for transport of fine particulate compactible material, said floor mat comprising:

an upper planar non-flexible sheet and a lower gas impermeable planar sheet held in spaced apart superimposed relationship by a plurality of rigid ribs which extend between the upper and lower planar sheets to form an array of channels that extend substantially a full area of the floor mat, said channels being opened at one end and closed at an opposite end;

a gas manifold comprising a flexible web, one end of which constituting an upper portion thereof is affixed to the upper planar sheet, whilst an opposing end of the web constituting a lower portion thereof is affixed to the lower planar sheet about the open ends of the channels in a manner so as to enable a flow of gas to be provided thereto; and means to secure said floor mat to the container when in use;

wherein said upper planar sheet and said upper portion of the manifold have a plurality of micro-perforations.

2. A floor mat as in claim 1 wherein the rigid ribs extend transversely across said mat.

3. A floor mat as in claim 1 wherein the upper and lower planar sheets and the rigid ribs are integrally formed.

4. A floor mat as in claim 3 wherein the integrally formed upper and lower planar sheets and rigid ribs are formed from synthetic plastics material or cardboard.

5. A floor mat as in claim 4 wherein the integrally formed upper and lower planar sheets and rigid ribs are formed from synthetic plastics material.

6. A floor mat as in claim 5 wherein the integrally formed upper and lower planar sheets and rigid ribs have a compressive strength of not less than about 150 kPa or load yield of not less than about 7 kg per cm$^2$.

7. A floor mat as in claim 1 wherein the flexible web is closed at one end and adapted for connection to a pressurized gas source at an opposite end.

8. A floor mat as in claim 7 wherein a rigid pipe is disposed longitudinally within the gas manifold, one end of the pipe being closed whilst another end is adapted for connection to the pressurized gas source, said pipe having disposed along a length thereof a series of holes.

9. A floor mat as in claim 8 wherein the pipe extends about one meter into the gas manifold and the holes are 6 to 12 mm in diameter.

10. A floor mat as in claim 9 wherein the floor mat is dimensioned to substantially occupy at least a full area of a floor of the shipping container to which it is to be fitted.

11. A floor mat as in claim 10 wherein a width of the planar sheets is 20 to 120 mm less than an inside width of the shipping container.

12. A floor mat as in claim 11 wherein the micro-perforations are about 0.1–0.2 mm in diameter, at a rate of about 35,000 per square meter.

13. A floor mat as in claim 1 wherein the planar sheets are mechanically creased so as to permit folding of said floor mat.

14. A container liner for a shipping container which is useful for transport of fine particulate compactible material, comprising:

a floor mat comprising an upper planar non-flexible sheet and a lower gas impermeable planar sheet held in spaced apart superimposed relationship by a plurality of rigid ribs which extend between the upper and lower planar sheets to form an array of channels that extend substantially a full area of the floor mat, said channels being opened at one end and closed at an opposite end; and a first gas manifold comprising a flexible web, one end of which constituting an upper portion thereof is affixed to the upper planar sheet, whilst an opposing end of the web constituting a lower portion thereof is affixed to the lower planar sheet about the open ends of the channels in a manner so as to enable a flow of gas to be provided thereto, said upper planar sheet and said upper portion of the manifold having a plurality of micro-perforations;

a collapsible web surrounding a periphery of the floor mat so as to form with the floor mat an enclosed space to contain the fine particulate compactible material, said collapsible web having means to connect to an inside of the container so as to permit the collapsible web to be formed into upstanding walls when installed in the container; and means to secure said floor mat to the container when in use.

15. A container liner as in claim 14 wherein eyeletted tags are provided at tops of the walls to permit connection to the inside of the container.

16. A container liner as in claim 15 including an outlet in the walls.

17. A container liner as in claim 16 wherein flow directors are formed into the floor mat by mechanically creasing triangular portions of the mat adjacent said outlet, said triangular being folded upwardly and supporting means placed thereunder when the container liner is disposed in the container, thereby producing a chute-like shape.

18. A container liner as in claim 14 wherein a second gas manifold is provided along a longitudinal edge of the floor mat opposite to that of the first gas manifold, said second gas manifold functioning to both close the channels along the edge and provide a flow of gas thereto.

19. A container liner as in claim 18 wherein a rigid pipe is disposed longitudinally within the second gas manifold, one end of the pipe being closed whilst another end is adapted for connection to a compressed gas source, said pipe having disposed along a length thereof a series of 6 to 12 mm holes.

* * * * *